United States Patent  
Bentrim

(10) Patent No.: US 10,704,581 B2  
(45) Date of Patent: Jul. 7, 2020

(54) PRESS-IN FASTENER WITH A WAVY KNURLED SHANK

(71) Applicant: Penn Engineering & Manufacturing Corp., Danboro, PA (US)

(72) Inventor: Brian G. Bentrim, Furlong, PA (US)

(73) Assignee: Penn Engineering & Manufacturing Corp., Danboro, PA (US)

( * ) Notice: Subject to any disclaimer, the term of this patent is extended or adjusted under 35 U.S.C. 154(b) by 0 days.

(21) Appl. No.: 16/185,048

(22) Filed: Nov. 9, 2018

(65) Prior Publication Data

US 2019/0145450 A1 May 16, 2019

Related U.S. Application Data

(60) Provisional application No. 62/586,083, filed on Nov. 14, 2017.

(51) Int. Cl.
*F16B 15/00* (2006.01)
*F16B 13/02* (2006.01)
*F16B 4/00* (2006.01)

(52) U.S. Cl.
CPC .............. *F16B 13/02* (2013.01); *F16B 4/004* (2013.01)

(58) Field of Classification Search
CPC .................................................. F16B 25/0052
USPC ..... 411/411, 412, 416, 451.5, 452–454, 456, 411/451.2, 451.3, 451.4, 464, 180
See application file for complete search history.

(56) References Cited

U.S. PATENT DOCUMENTS

| 2,015,159 | A | | 9/1935 | Rosenberg Heyman |
| 2,191,771 | A | | 2/1940 | Olson |
| 2,269,708 | A | | 1/1942 | Dickson |
| 3,477,334 | A | * | 11/1969 | Stone ...................... F16B 15/06 411/453 |
| 4,776,739 | A | | 10/1988 | Hamman |
| 5,340,254 | A | * | 8/1994 | Hertel ................. F16B 25/0021 411/311 |
| 5,489,179 | A | * | 2/1996 | Gabriel ................ F16B 5/0275 411/453 |
| 5,741,104 | A | * | 4/1998 | Lat ...................... F16B 15/0092 411/453 |

(Continued)

FOREIGN PATENT DOCUMENTS

EP 1223650 7/2002

*Primary Examiner* — Gary W Estremsky
(74) *Attorney, Agent, or Firm* — Gregory J. Gore, Esq.

(57) ABSTRACT

A press-in fastener incorporates a compound wave pattern into the shank knurl. The knurl is generally aligned vertically but instead of a straight uniform knurl pattern, the rows of knurls have an undulating curved shape that alternates from a narrow to a wider cross-section as they transverse axially along the length of the pin shank. The knurls are arranged in straight or serpentine longitudinal rows equally spaced around a circumference of the shank. At least one of the rows has a wavy cross-sectional profile in a radial plane containing the longitudinal axis wherein said profile consists of a series of contiguous alternating crests and valleys. The compound wavy configuration of the knurls yields a number of benefits without adversely affecting the manufacturing process. The knurl configuration also reduces the installation force and disruption of the host material while maintaining a better lock on the host material.

11 Claims, 3 Drawing Sheets

(56) References Cited

U.S. PATENT DOCUMENTS

| | | | | |
|---|---|---|---|---|
| 5,749,692 A | * | 5/1998 | Kish | F16B 15/0092 |
| | | | | 411/453 |
| 5,907,891 A | | 6/1999 | Meyer | |
| 6,340,277 B1 | * | 1/2002 | Koenig | F16B 25/0021 |
| | | | | 411/310 |
| 7,807,911 B2 | * | 10/2010 | Izutani | G10C 3/12 |
| | | | | 411/451.1 |
| 7,819,614 B2 | * | 10/2010 | Versino | F16B 15/06 |
| | | | | 411/451.3 |
| 8,348,576 B1 | | 1/2013 | Gaw | |
| 8,616,817 B2 | * | 12/2013 | Siemers | F16B 19/14 |
| | | | | 411/411 |
| 8,651,787 B2 | * | 2/2014 | Levey | F16B 37/122 |
| | | | | 411/172 |
| 8,858,144 B2 | * | 10/2014 | Van Cor | F16B 33/02 |
| | | | | 411/310 |
| 8,888,428 B2 | * | 11/2014 | Park | F16B 37/122 |
| | | | | 411/178 |
| 9,903,409 B2 | * | 2/2018 | Prabhu | F16B 37/127 |

\* cited by examiner

PRESS-IN FASTENER WITH A WAVY KNURLED SHANK

RELATED APPLICATION

This application is a non-provisional patent application related to provisional patent application Ser. No. 62/586,083 filed on Nov. 14, 2017 entitled, "Press-In Fastener with Wavy Knurled Shank" priority from which is hereby claimed.

FIELD OF THE INVENTION

The present invention is related to press-in fasteners of the type which force-fit into the aperture of a receiving object such as a panel. More specifically, it relates to fasteners of this type that have features on their shanks to enhance the engagement with a receiving object to increase the fastener's pull-out resistance.

BACKGROUND OF THE INVENTION

Press-in fasteners such as the TackSert® fastener product line of Penn Engineering & Manufacturing Corp. have diagonal knurls. These pins can be installed into either brittle or soft material by pushing the head and allowing the knurls to enter the host material. During this installation one or a combination of two things happens: the knurls cut and dig into a more brittle host or the knurls push aside a more malleable host.

In brittle materials, the knurls will cut the host and pack the cut material into the knurl teeth creating a press-fit situation to create a tight bond between the pin and the host material. Because this packed material represents already cut and weakened pieces, the retention force is adversely affected. In a more ductile and malleable host, the displacement force pushing inward axially can fold-over and plow ahead the host instead of allowing it to flow around the knurl.

Other knurl configurations have not improved this need in the art for a more effective knurl with enhanced retention force. Straight or vertical knurls pull out axially very easily due to a lack of any mechanical means of retention. Diamond knurls cause more localized destruction of the host reducing further the retention forces. Ribbing, i.e. horizontal 'knurls', allows better performance in some more elastic hosts, but in brittle hosts or less elastic hosts, the retention is worse. Diagonal knurls will cause the pin to rotate during installation as the pin tries to naturally minimize the forces to install. This can cause a slight reduction in the retention force.

There is therefore a need in the fastener arts for an improved tack pin fastener that will overcome the above described deficiencies in fastener retention and be effective in a wide variety of host materials of varying hardness.

SUMMARY OF THE INVENTION

In order to meet the need in the art for a more effective press-in fastener the present fastener has been devised which incorporates a compound wave pattern into the shank knurl. This knurl configuration reduces the installation force and disruption of the host material while maintaining a better lock on the host material after installation. The knurl pattern is generally aligned in longitudinal rows along either a straight or a serpentine path. In one embodiment the row of knurls alternate in width from a narrow to a wider arcuate cross-section as the rows transverse axially along the length of the fastener shank. They also can have a wavy pattern with peaks and valleys in the longitudinal plane. This compound wavy configuration in perpendicular planes of the knurls yields a number of benefits without adversely affecting the manufacturing process.

More specifically, the applicant has devised a fastener having a top, a bottom, and a central longitudinal axis. The fastener has from the top to the bottom in this order: a head at the top being the largest diameter of the fastener; a shank extending immediately downward from the head, said shank having a plurality of knurls extending radially therefrom; and wherein the knurls are arranged in a plurality of rows, each row following either a straight or serpentine longitudinal path. The rows are equally spaced radially around a circumference of the shank with at least one of said rows of knurls having a wavy cross-sectional profile that lies in the longitudinal plane containing the longitudinal axis. The profile can consist of a series of contiguous alternating arcuate peaks and arcuate valleys.

In one embodiment, each row of knurls is not straight but defined by a serpentine string of knurls with arcuate sides that radially project from the generally cylindrical shank of the fastener. The individual knurls of a row of knurls may be joined by arcuate narrowed sections that follow a longitudinal serpentine path.

In the above embodiments at least one of said rows also has a wavy cross-sectional profile in a lateral plane of the row perpendicular to said longitudinal plane. The fastener may have rows of knurls that extend substantially the entire length of the fastener shank and the rows of knurls can be longitudinally staggered such that the peaks of one row are in axial alignment with the valleys of adjacent rows.

In another version of the invention, rows of splines follow a longitudinal zig-zag path. Here, all the rows are about the same radial height, each row having a triangular profile with a base and a peak defining the maximum height of the row.

During installation, the knurl configurations described above provide a front-face of the knurl that moves the material forward and a rear-face of the knurl that allows the material to relax or move back into the cavity created behind the knurl.

In brittle hosts, the wavy knurl minimizes the sheared area in a similar manner to what is done with a straight (vertical) knurl. By slicing directly into the host each knurl cuts down directly in one shear line that does not impact adjacent shear lines. In contrast, with a diagonal or diamond knurl, the brittle material is cut and sawn through with the repeated ridges moving into the host.

The single shear line is parted and spread by the angular walls of the knurl which while resisting the parting action place high friction loads onto the sides of the knurls. At the tip or crest of the knurl, the host material will respond with a sharp crack. With a vertical, straight knurl, these frictional forces are all that keep the knurl in the host material. However with the wavy knurl, while there is still the frictional force effect, the wave provides a mechanical interference along the axis of the wave due to the varying cross-section of the wave. The symmetric shape of the wave ensures that the forces are balanced, but the changing cross-section induces a force to resist the axial pull-out. This requires that the host material have some elasticity, and is not perfectly brittle or perfectly plastic, for as the front-face of the wave knurl is pushed into the host, any elasticity will cause some closure of the host behind along the trailing-face of the knurl.

In either malleable or ductile host materials, the wavy knurls performs much in the same way, but here, instead of cutting into the host, the host is pushed aside in an elastic or plastic manner. Any elastic behavior will cause the same forces as described above with regard to brittle host materials. However instead of a crack, the ductile material will demonstrate a curved response at the crest of the knurl. The straight and wave knurl have an advantage again over the diagonal or diamond knurl. As the diamond or diagonal knurl is engaged into the host, the host must respond by moving out of the way and filling in behind as the each knurl in sequence as it passes causing a work-hardening or embrittling of the host weakening its response with each passing across the install.

Most host materials will perform and respond in a combination of both extremes described above with regard to either brittle and malleable hosts. The advantage of the wavy design is that the mechanics and function between the two extremes work on a continuum that can be predictable, where the straight, diamond and diagonal knurls see a discontinuity of function at some point along the shift from brittle to malleable where the material begins to respond in a different way to the installation action.

It is therefore an object of the present invention to improve the retention of press-in fasteners into a variety of host materials by employing a new knurl configuration. It has been found that a particular knurl configuration described herein as "wavy" yields better retention within a wide variety of host materials. Other objects and advantages will be apparent to those of skill in the art from the following drawings and detailed description of one embodiment.

DESCRIPTION OF THE PREFERRED EMBODIMENT

As used herein the terms "high" and "low" refer to the height of the knurl as measured from the longitudinal axis of the fastener shank along a longitudinal plane of the shank, the low points of the knurls collectively defining boundaries of a cylinder. The term "lateral" as used herein with regard to the individual knurls refers to the direction perpendicular to the longitudinal plane that bisects that knurl. The terms "axial" and "longitudinal" refer to the direction parallel to the central longitudinal axis of the fastener shank that is cylindrical in nature.

Figure 1:
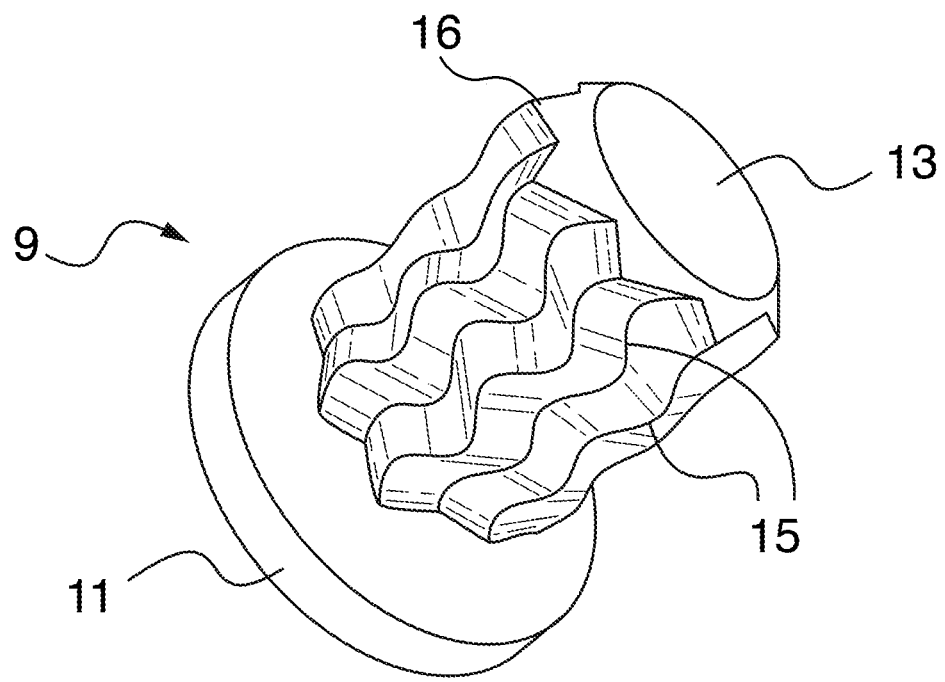
FIG. 1 is a bottom left perspective view.
Figure 2:
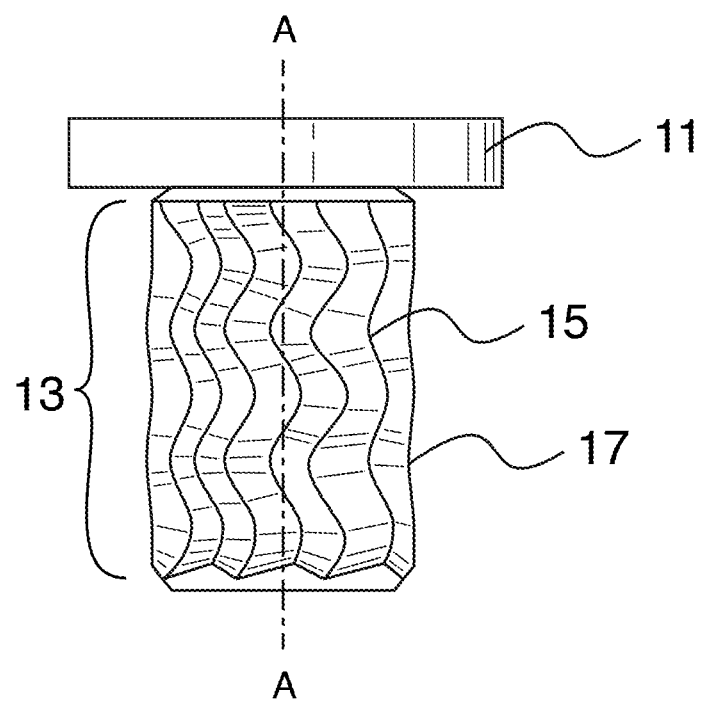
FIG. 2 is an elevation view of the embodiment of FIG. 1.

Referring now to FIGS. 1 and 2, one embodiment of the fastener of the invention 9 is shown which has a head 11 being the largest diameter of the fastener. In this embodiment, the rows of knurls 15 extend substantially the entire length of the shank 13 and follow a zig-zag path along a longitudinal direction A-A. Here, all the rows are of the same radial height as depicted by the straight edge line 17 of FIG. 2 with a general triangular profile having straight sides and a peak 16 seen in FIG. 1 defining the maximum height of the row.

Figure 3:
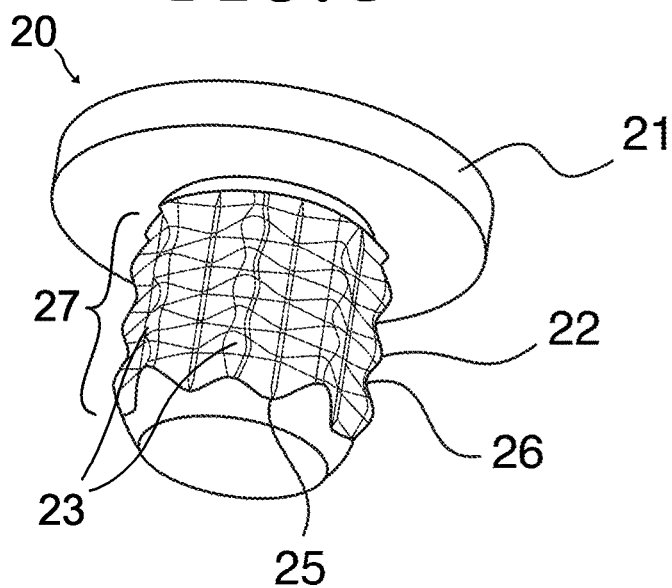
FIG. 3 is a bottom right perspective view of an alternate embodiment.
Figure 6:
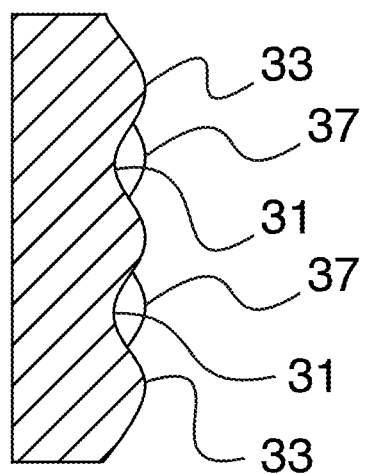
FIGS. 6 and 7 are sectional views taken from FIG. 5 as shown in the Figure.
Figure 7:
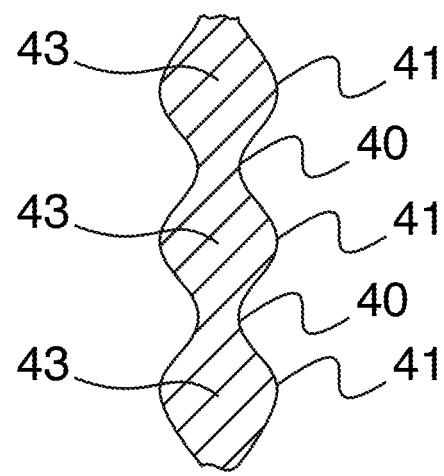

A seen in FIG. 3 fastener 20, like the embodiment of FIGS. 1 and 2, has a head 21 of largest diameter of the fastener. Each row of knurls 23 extends substantially the entire length of the shank 27. This fastener has eight straight longitudinal rows of knurls as shown by the straight longitudinal troughs 25 between each row. The cross-section of each knurl row in its longitudinal plane consists of a series of contiguous arcuate peaks 22 and valleys 26 which define a wavy profile as seen in FIG. 6. Likewise, in the lateral plane of each row the shape of the cross-section of that row is also wavy, comprising undulating wide and narrow arcuate portions as seen in FIG. 7. Each knurl has an arcuate smooth side surface, which appears to the eye as a raised hump or bump on the circumference of the shank.

In the embodiment of FIG. 3, each axial row of knurls has the same starting point to its wavy profile beginning at the end of the fastener shank. That is to say that the peaks and valleys of the rows are all in alignment longitudinally. Also, all points of a lateral cross-section perpendicular to the longitudinal axis of the shank through that row are symmetrical and identical for each knurl row.

Figure 4:
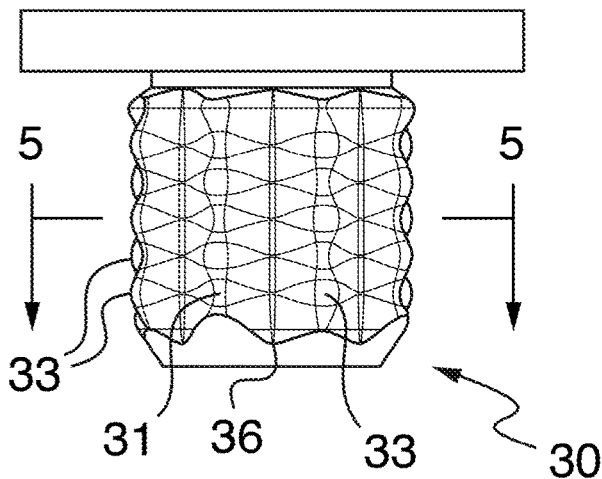
FIG. 4 is an elevation view of an alternate embodiment.
Figure 5:
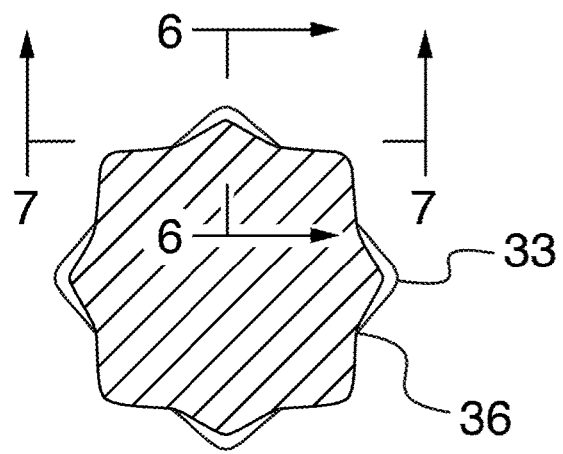
FIG. 5 is a sectional view taken from FIG. 4 as shown in that Figure.

FIGS. 4 through 7 show the same shape of the individual knurl rows as in FIG. 3, but the fastener 30 shown in FIG. 4 has the eight rows of knurls longitudinally offset from one row to the other. In this configuration, each row of knurls starts from the end of the shank longitudinally offset from its counterpart in the neighboring row so that the peaks 33 of one row are aligned longitudinally to the valleys 31 of the adjacent row. Here, as in the FIG. 3 embodiment, each row of knurls is aligned along a straight longitudinal path shown by the straight intermediate trough 36 between the rows as also seen in FIG. 5.

Referring now to FIGS. 6 and 7, the wavy shape of the individual knurls in the FIGS. 3 and 4 embodiments is depicted. In FIG. 6, we see the wavy longitudinal profile of the arcuate peaks 33 and valleys 31 of the rows of the FIG. 4 embodiment. It is also clearly shown here that the peaks 37 of a next row are longitudinally aligned with the valleys 31 of the first row thus illustrating the offset nature of the adjacent rows. This is the distinguishing feature between the embodiments of FIGS. 3 and 4. In FIG. 7, we see that individual knurls 43 of a row of either the FIG. 3 or FIG. 4 embodiments have arcuate sides 41, which may be joined by intermediate arcuate narrow sections 40, which follow along a straight longitudinal path. In variations of these embodiments, the narrow intermediate sections may be eliminated if the valleys seen in FIG. 6 are deep enough to reach the shank. In all embodiments, the knurls appear to the eye as a plurality of round bumps extending radially from a generally cylindrical shank.

Figure 8:
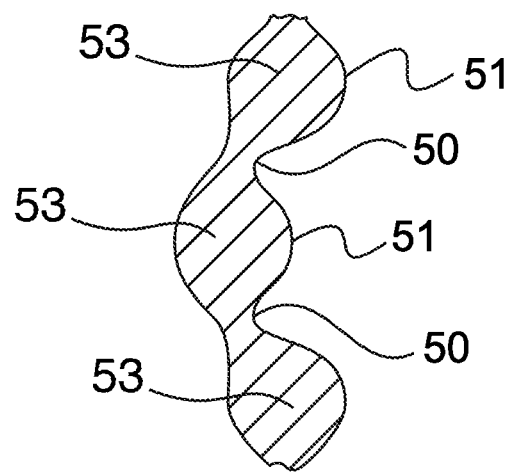
FIG. 8 is a section view of an alternate embodiment.

In FIG. 8, we see a cross-sectional depiction of a knurl row from the same view as FIG. 7 that represents yet another embodiment. The rows here are basically the same as that depicted in FIG. 3 except that rather than the individual rows following a straight longitudinal alignment as seen in FIG. 7, the individual rows follow a serpentine path similar to the zig-zag pattern shown in FIGS. 1 and 2. Like FIG. 7, the shape of the knurls 53 is defined by arcuate sides 51 joined by intermediate narrow sections 50. In variations of this embodiment, the narrow sections may not occur and thus not appear from this view if the valleys as seen in FIG. 6 are so deep that they meet the surface of the shank from which the knurls protrude.

From the above description of the invention it will be apparent to those of skill in the art that the object of the invention to devise an improved pin fastener with greater attachment strength in a variety of host materials has been achieved. It will also be apparent to those of skill in the art that many variations and adaptations of what has been disclosed are possible. For example, the fastener can be composed of any material suitable for its function and there may be more or fewer than the eight rows of knurls depicted in the embodiments shown. There may be many other variations on the embodiment depicted herein that do not depart from the spirit and scope of the invention, which shall be determined only by the claims and their legal equivalents.

The invention claimed is:

1. A fastener, comprising:
   a substantially cylindrical fastener having a top, a bottom, and a central longitudinal axis extending from the top to the bottom;
   a head located at the top being the largest diameter of the fastener;
   a shank extending immediately downward from the head, said shank having a plurality of contiguous knurls extending radially therefrom;
   wherein the knurls are arranged in rows, each row lying along a vertical line parallel to the longitudinal axis and the rows are equally spaced radially around a circumference of the shank; and
   wherein the cross-sectional profile at least one of said rows in a longitudinal plane containing the longitudinal axis of the fastener consists of a series of contiguous arcuate valleys between arcuate peaks.

2. The fastener of claim 1 wherein the at least one of said rows has a wavy cross-sectional profile in a lateral plane of the row perpendicular to said longitudinal plane, said profile having arcuate sides.

3. The fastener of claim 2 wherein the row is in a straight line.

4. The fastener of claim 2 wherein the row follows a serpentine path.

5. The fastener of claim 3 or claim 4 wherein the cross-sectional profile in the lateral plane has undulating arcuate sides with intermediate narrow sections in between the knurls.

6. The fastener of claim 1 wherein the fastener has a plurality of identical longitudinal rows.

7. The fastener of claim 6 wherein the rows are equally spaced about the circumference of the shank.

8. The fastener of claim 7 wherein the rows are longitudinally staggered such that the peaks of one row are in longitudinal alignment with the valleys of adjacent rows.

9. The fastener of claim 6 wherein the rows of knurls extend substantially the entire length of the shank.

10. The fastener of claim 1 wherein the cross-sectional profile in the lateral plane of the at least one row has wider and narrower areas between laterally opposing arcuate sides.

11. A fastener, comprising;
    a substantially cylindrical fastener having a top, a bottom, and a central longitudinal axis extending from the top to the bottom;
    a head at the top being the largest diameter of the fastener;
    a shank extending immediately downward from the head, said shank having a plurality of rows of splines of uniform radial height along their length and extending radially therefrom; and
    wherein each row of splines follows a zig-zag path in the longitudinal direction and all the rows are of the same radial height with a triangular cross-sectional profile having straight sides and a peak defining the maximum height of the rows.

* * * * *